US006956926B2

(12) United States Patent
Cesmeli et al.

(10) Patent No.: US 6,956,926 B2
(45) Date of Patent: Oct. 18, 2005

(54) METHOD AND APPARATUS FOR SELECTING A RECONSTRUCTION PROJECTION SET

(75) Inventors: Erdogan Cesmeli, Clifton Park, NY (US); Peter Michael Edic, Albany, NY (US); Maria Iatrou, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 10/335,826

(22) Filed: Dec. 31, 2002

(65) Prior Publication Data

US 2004/0017881 A1 Jan. 29, 2004

Related U.S. Application Data

(60) Provisional application No. 60/397,658, filed on Jul. 23, 2002.

(51) Int. Cl.[7] .................................................. A61B 6/00
(52) U.S. Cl. ............................................... 378/8; 378/4
(58) Field of Search .......................... 378/4, 8, 15, 19, 378/901

(56) References Cited

U.S. PATENT DOCUMENTS

| | | | | |
|---|---|---|---|---|
| 6,175,609 B1 | | 1/2001 | Edic et al. | 378/7 |
| 6,324,243 B1 | | 11/2001 | Edic et al. | 378/4 |
| 6,353,653 B1 | * | 3/2002 | Edic | 378/8 |
| 6,529,576 B2 | * | 3/2003 | Hsieh et al. | 378/15 |

OTHER PUBLICATIONS

Achenbach, Stephan, M.D., et al., In–Plane Coronary Arterial Motion Velocity: Measurement with Electron–Beam CT, Cardiac Imaging, vol. 216, #2, pp. 457–463, Aug. 2000.

Chung, Edward K., M.D. Pocket Guide to ECG Diagnosis, Cambridge: Blackwell Science, pp. 28–38, 1996.

Hu, Hui et al., Multislice Helical CT: Image Temporal Resolution, IEEE Transactions on Medical Imaging, vol. 19, No. 5, May 2000, pp. 384–389.

Kopp, Andreas F., M.D. et al., Coronary Arteries: Retrospectively ECG–gated Multi–Detector Row CT Angiography with Selective Optimization of the Image Reconstruction Window, Cardiac Imaging, vol. 221, #3, pp. 683–688, Radiology Dec. 2001.

Woodhouse, C.E, et al., Coronary arteries: Retrospective cardiac gating technique to reduce cardiac motion artifact at spiral CT, Radiology, vol. 204, No. 2, Aug. 1997, pp. 566–569.

* cited by examiner

*Primary Examiner*—David V. Bruce
*Assistant Examiner*—Elizabeth Keaney
(74) *Attorney, Agent, or Firm*—Fletcher Yoder (57) ABSTRACT

A technique is provided for improving consistency between slabs in a reconstructed CT image. Candidate sectors associated with an image slab are determined. If the sectors contain sufficient information to reconstruct the image slab, the sector which minimizes inconsistency with projection data for adjacent image slabs is selected for reconstruction. If the sectors do not contain sufficient information to reconstruct the slab, sectors are merged together until a merge group contains sufficient information. The merge group which minimizes inconsistency with projection data for adjacent image slabs is selected for image reconstruction. The selected sectors or merge groups are then reconstructed with the resulting image slabs comprising a reconstructed image with improved consistency between image slabs.

20 Claims, 6 Drawing Sheets

200
METHOD AND APPARATUS FOR SELECTING A RECONSTRUCTION PROJECTION SET

CROSS-REFERENCE TO RELATED APPLICATIONS

This application claims the benefit of U.S. Provisional Application No. 60/397,658 filed on Jul. 23, 2002.

BACKGROUND OF THE INVENTION

The present invention relates generally to the field of medical imaging and more specifically to the field of cardiac imaging by computed tomography. In particular, the present invention relates to the selection of reconstruction projection data to minimize motion artifacts.

Computed tomography (CT) imaging systems measure the attenuation of X-ray beams passed through a patient from numerous angles. Based upon these measurements, a computer is able to reconstruct images of the portions of a patient's body responsible for the radiation attenuation. As will be appreciated by those skilled in the art, these images are based upon separate examination of a series of angularly displaced projection images. A CT system produces data that represents the line integral of linear attenuation coefficients of the scanned object. This data is then reconstructed to produce an image, which is typically displayed on a cathode ray tube, and may be printed or reproduced on film. A virtual 3-D image may also be produced by a CT examination.

CT scanners operate by projecting fan shaped or cone shaped X-ray beams from an X-ray source that is collimated and passes through the object, such as a patient. The attenuated beams are then detected by a set of detector elements. The detector element produces a signal based on the attenuation of the X-ray beams, and the data are processed to produce signals that represent the line integrals of the attenuation coefficients of the object along the ray paths. These signals are typically called projections. By using reconstruction techniques, such as filtered backprojection, useful images are formulated from the projections. The locations of pathologies may then be identified either automatically, such as by a computer-assisted diagnosis (CAD) algorithm or, more conventionally, by a trained radiologist. CT scanning provides certain advantages over other types of techniques in diagnosing disease particularly because it illustrates the accurate anatomical information about the body. Further, CT scans may help physicians distinguish between types of abnormalities more accurately.

Cardiac imaging, such as for the assessment of coronary artery stenosis, using CT imaging techniques presents certain problems, however, due to the dynamic nature of the heart and the fine structures of the coronary vessels. The volume of the heart changes drastically during systole and during the rapid inflow of blood into the ventricles. High temporal resolution is generally desired to freeze the heart motion, while high spatial resolution is needed to identify the moving coronary vessels and the stenotic lesions.

To avoid the imaging problems associated with these substantial volume changes, it is generally desirable to acquire the projection data for image reconstruction during a prescribed phase of interest, typically the end-diastolic phase of the cardiac cycle, when the heart volume is relatively constant. Unfortunately, the mechanical gantries typically available in CT systems do not rotate fast enough to capture a motion-free volume rendering of the heart at various heart rates. These two constraints, selecting a reconstruction data set with the desired cardiac phase and achieving the desired temporal resolution, may be difficult to satisfy simultaneously.

A conventional reconstruction algorithm compensates for these problems by defining the prescribed phase of interest as a percentage of the cardiac cycle for the whole cardiac volume. The reconstruction algorithm therefore positions reconstruction windows, corresponding to the projection data to be analyzed, at prescribed increments from the measured R-peaks in the cardiac cycle. Axial image slabs are generated using the reconstructed image data such that each slab comprises a set of one or more images generated at the same phase of the same cardiac cycle. The number of the images comprising the set is determined by the heart rate and the associated pre-selected table speed, i.e., the linear displacement of the subject. The resulting image slabs, when associated together in order, comprise the desired cardiac volume rendering.

The reconstruction algorithms do not, however, account for changes in cardiac motion at different heart rates or for cardiac volume changes within the same heart cycle. Instead, the reconstruction window is specified by the algorithm at prescribed increments, without accounting for the subsequent R-peak, the P-wave, or to the QT interval of the patient's heart cycle. As a result, if the patient's heart rate changes or if beat irregularities are present, the reconstruction window may be specified outside of the prescribed phase of interest, such as over a T- or P-wave. When this occurs, the image slabs comprising the image of the cardiac volume may be shifted or offset in the coronal and sagittal views, producing phase misregistration artifacts. The so-called "phase misregistration" artifacts occur when successive reconstructed slabs correspond to cardiac cycles at different heart rates, resulting in one slab that is derived at a different state of the cardiac cycle than its neighbors.

One method of addressing this problem is to allow the operator to manually visualize the reconstruction at different phases and to manually select those reconstructions that result in the lowest amount of artifacts in the reformats of the axial data. This manually generated volume of data is then used to construct the cardiac images used for analysis and diagnosis. The method, however, is operator intensive and subject to subjective determinations. A method of addressing this problem, which is less subjective, and less operator intensive is desirable.

BRIEF DESCRIPTION OF THE INVENTION

The present technique provides a novel method and apparatus using acquired projection data to improve consistency between slabs in a reconstructed image. In half scan reconstruction, the projection data corresponding to an image slab is determined by selecting the available sector which satisfies provided consistency criteria and which thereby yields the best consistency between projection data for adjacent image slabs in the reconstructed image. In multi-sector reconstruction, the projection data corresponding to an image slab is determined by selecting the available merge group of sectors which satisfies provided consistency criteria and which thereby yields the best consistency between projection data for adjacent image slabs in the reconstructed image.

In accordance with one aspect of the technique, a method is provided for selecting a projection set for one or more image slabs. One or more candidate sectors or sets of candidate sectors containing projection data associated with each of one or more images is determined. The one or more candidate sectors or sets of candidate sectors is evaluated based upon one or more consistency criteria. A suitable sector or set of sectors from the one or more candidate sectors or sets of candidate sectors is selected for reconstruction into an image. The selected suitable sector or set of sectors provides the best consistency with projection data for an adjacent image based upon the one or more consistency criteria.

In accordance with another aspect of the technique, a tangible medium is provided for selecting a projection set for one or more image slabs. The tangible medium includes a routine for determining one or more candidate sectors or sets of candidate sectors containing projection data associated with each of one or more images. In addition, the tangible medium includes a routine for evaluating the one or more candidate sectors or sets of candidate sectors. The one or more candidate sectors or sets of candidate sectors are evaluated based upon one or more consistency criteria. The tangible medium also includes a routine for selecting a suitable sector or set of sectors from the one or more candidate sectors or sets of candidate sectors for reconstruction into an image. The suitable sector or set of sectors provides the best consistency with projection data for an adjacent image based upon the one or more consistency criteria.

In accordance with a further aspect of the technique, a CT image analysis system is provided which includes an X-ray source configured to emit a stream of radiation and a detector configured to detect the stream of radiation and to generate one or more signals responsive to the stream of radiation. The system also includes a system controller configured to control the X-ray source and to acquire the one or more signals, wherein the one or more signals comprise a set of projection data. Also included is a computer system capable of being operably coupled to at least one of a CT cardiac image acquisition system or CT image storage system. The computer system is configured to determine one or more candidate sectors or sets of candidate sectors containing projection data associated with each of one or more images. The computer system is also configured to evaluate the one or more candidate sectors or sets of candidate sectors based upon one or more consistency criteria. In addition, the computer system is configured to select a suitable sector or set of sectors from the one or more candidate sectors or sets of candidate sectors for reconstruction into an image. The selected sector or set of sectors provides the best consistency with projection data for an adjacent image based upon the one or more consistency criteria. The system also includes an operator workstation configured to display a reconstructed image generated by the computer system.

In accordance with a further aspect of the technique, a CT image analysis system is provided which includes an X-ray source configured to emit a stream of radiation and a detector configured to detect the stream of radiation and to generate one or more signals responsive to the stream of radiation. The system also includes a system controller configured to control the X-ray source and to acquire the one or more signals, wherein the one or more signals comprise a set of projection data. Also included is a computer system capable of being operably coupled to at least one of a CT cardiac image acquisition system or CT image storage system. The computer system includes a means for minimizing inconsistency between images. The system also includes an operator workstation configured to display a reconstructed image generated by the computer system.

In accordance with one aspect of the technique, a method is provided for selecting a set of projection datasets for reconstruction. An initial set of projection datasets corresponding to a desired stack of images is obtained. At least one of a merge cost and a consistency criterion is calculated for each projection dataset corresponding to an image of the desired stack of images. The projection dataset corresponding to each image is selected based upon at least one of the merge cost and the consistency criterion.

In accordance with another aspect of the technique, a tangible medium for selecting a set of projection datasets for reconstruction is provided. The tangible medium includes a routine for obtaining an initial set of projection datasets corresponding to a desired stack of images. A routine for calculating at least one of a merge cost and a consistency criterion for each projection dataset corresponding to an image of the desired stack of images is also included. In addition, the medium includes a routine for selecting the projection dataset corresponding to each image based upon at least one of the merge cost and the consistency criterion.

In accordance with a further aspect of the technique, a CT image analysis system is provided which includes an X-ray source configured to emit a stream of radiation and a detector configured to detect the stream of radiation and to generate one or more signals responsive to the stream of radiation. The system also includes a system controller configured to control the X-ray source and to acquire the one or more signals, wherein the one or more signals comprise a set of projection data. Also included is a computer system capable of being operably coupled to at least one of a CT cardiac image acquisition system or CT image storage system. The computer system is configured to obtain an initial set of projection datasets corresponding to a desired stack of images. In addition, the computer system is configured to calculate at least one of a merge cost and a consistency criterion for each projection dataset corresponding to an image of the desired stack of images. The computer system is also configured to select the projection dataset corresponding to each image based upon at least one of the merge cost and the consistency criterion. The system also includes an operator workstation configured to display a reconstructed image generated by the computer system.

In accordance with a further aspect of the technique, a CT image analysis system is provided which includes an X-ray source configured to emit a stream of radiation and a detector configured to detect the stream of radiation and to generate one or more signals responsive to the stream of radiation. The system also includes a system controller configured to control the X-ray source and to acquire the one or more signals, wherein the one or more signals comprise a set of projection data. Also included is a computer system capable of being operably coupled to at least one of a CT cardiac image acquisition system or CT image storage system. The computer system includes means for selecting a set of projection datasets for reconstruction. The set of projection datasets correspond to a desired stack of images. The system also includes an operator workstation configured to display a reconstructed image generated by the computer system.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
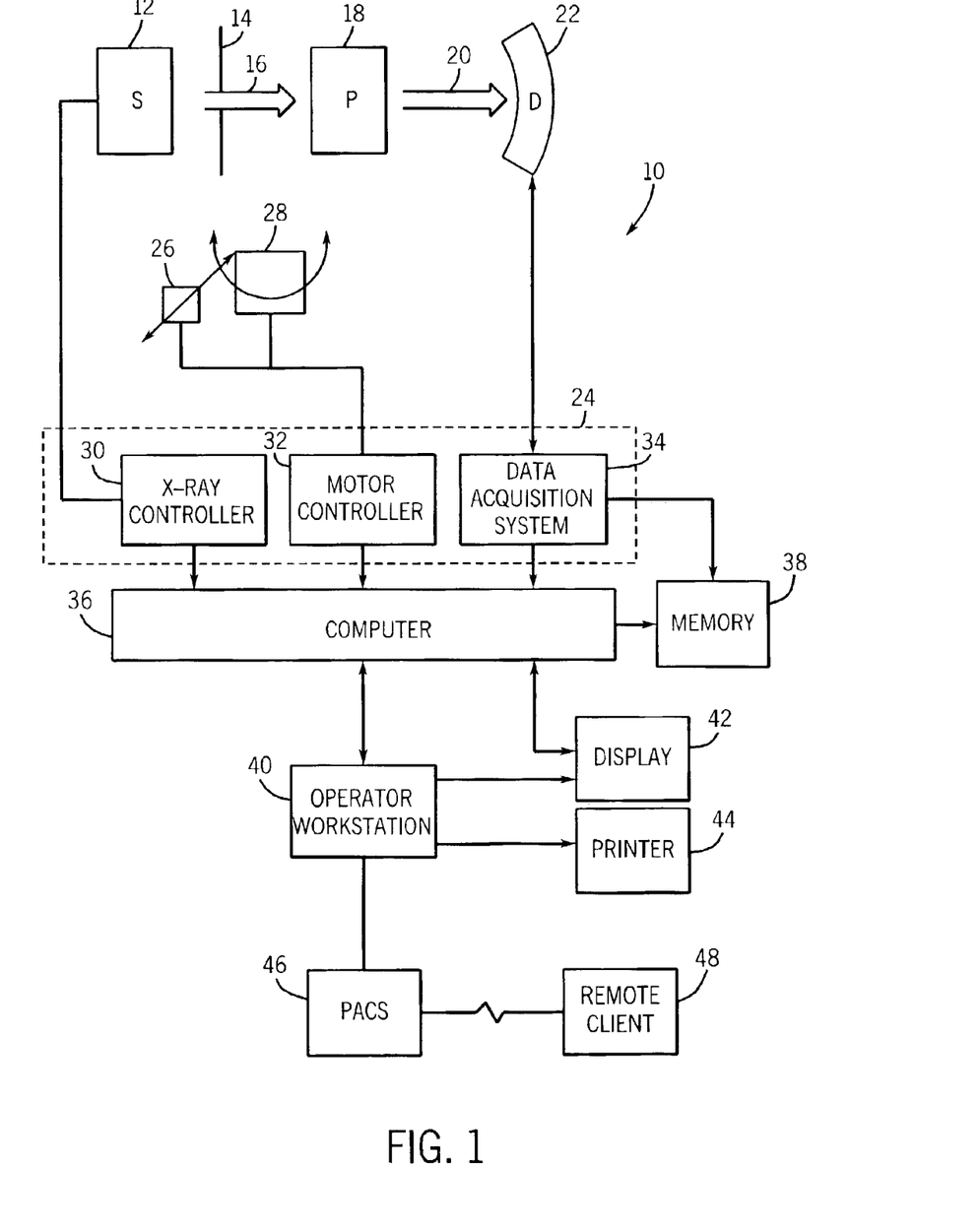
FIG. 1 is a diagrammatical view of an exemplary imaging system in the form of a CT imaging system for use in producing processed images in accordance with aspects of the present technique.

FIG. 1 illustrates diagrammatically an imaging system 10 for acquiring and processing image data. In the illustrated embodiment, system 10 is a computed tomography (CT) system designed both to acquire original image data, and to process the image data for display and analysis in accordance with the present technique. In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube.

Collimator 14 permits a stream of radiation 16 to pass into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24, which furnishes both power, and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a linear positioning subsystem 26 and rotational subsystem 28. The rotational subsystem 28 enables the X-ray source 12, collimator 14 and the detector 22 to be rotated one or multiple turns around the patient 18. It should be noted that the rotational subsystem 28 might include a gantry. Thus, the system controller 24 may be utilized to operate the gantry. The linear positioning subsystem 26 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 28 and the linear positioning subsystem 26.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data might be utilized by such an exemplary system 10. Moreover, the memory 38 may be located at this acquisition system or may include remote components for storing data, processing parameters, and routines described below. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed by a printer 44 which may be coupled to the operator workstation 40. The display 42 and printer 44 may also be connected to the computer 36, either directly or via the operator workstation 40. Further, the operator workstation 40 may also be coupled to a picture archiving and communications system (PACS) 46. It should be noted that PACS 46 might be coupled to a remote system 48, radiology department information system (RIS), hospital information system (HIS) or to an internal or external network, so that others at different locations may gain access to the image and to the image data.

It should be further noted that the computer 36 and operator workstation 40 may be coupled to other output devices, which may include standard, or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
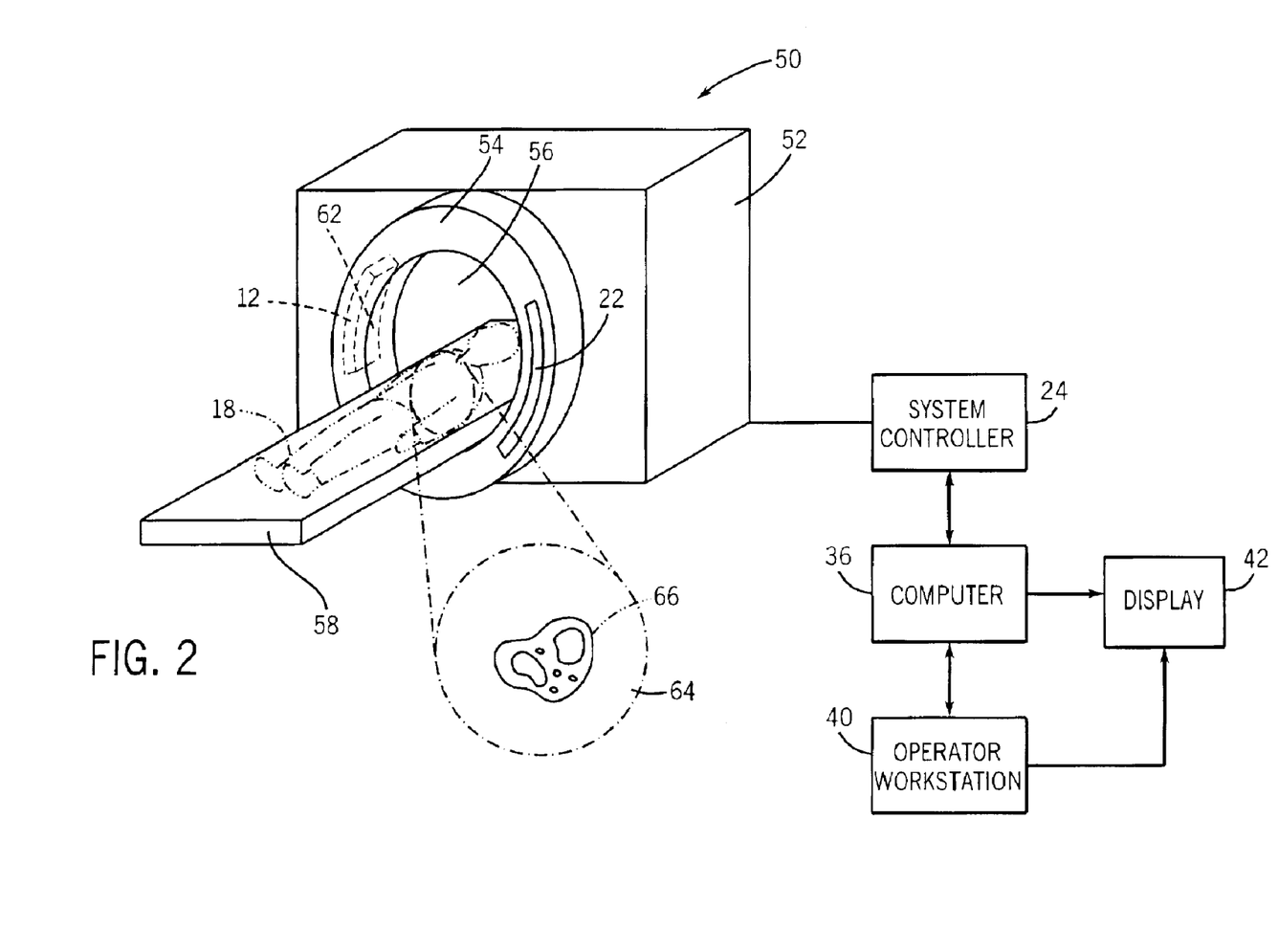
FIG. 2 is another diagrammatical view of a physical implementation of the CT system of FIG. 1.

Referring generally to FIG. 2, an exemplary imaging system utilized in a present embodiment may be a CT scanning system 50. The CT scanning system 50 is typically a multi-slice detector CT (MDCT) system that offers a wide array of axial coverage, high gantry rotational speed, and high spatial resolution, all of which allow the use of sophisticated cardiac reconstruction algorithms. The CT scanning system 50 is illustrated with a frame 52 and a gantry 54 that has an aperture 56. The aperture 56 may typically be 50 cm in diameter. Further, a patient table 58 is illustrated positioned in the aperture 56 of the frame 52 and the gantry 54. The patient table 58 is adapted so that a patient 18 may recline comfortably during the examination process. Additionally, the patient table 58 is configured to be displaced linearly by the linear positioning subsystem 26 (see FIG. 1). The gantry 54 is illustrated with the source of radiation 12, typically an X-ray tube that emits X-ray radiation from a focal point 62. For cardiac imaging, the stream of radiation is directed towards the heart of the patient 18.

In typical operation, X-ray source 12 projects an X-ray beam from the focal point 62 and toward detector array 22. The detector 22 is generally formed by a plurality of detector elements, which sense the X-rays that pass through and around a subject of interest, such as the heart and chest. Each detector element produces an electrical signal that represents the intensity of the X-ray beam at the position of the element at the time the beam strikes the detector. Furthermore, the gantry 54 is rotated around the subject of interest so that a plurality of radiographic views may be collected by the computer 36. Thus, an image or slice is computed which may incorporate, in certain modes, less or more than 360 degrees of projection data, to formulate an image. The image is collimated to desired dimensions, typically less than 40 mm thick using either lead shutters in front of the X-ray source 12 and different detector apertures. The collimator 14 (see FIG. 1) typically defines the size and shape of the X-ray beam that emerges from the X-ray source 12.

Thus, as the X-ray source 12 and the detector 22 rotate, the detector 22 collects data of the attenuated X-ray beams. Data collected from the detector 22 then undergoes preprocessing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10. The main computer that controls the operation of the system may be adapted to control features enabled by the system controller 24. Further, the operator workstation 40 is coupled to the computer 36 as well as to a display, so that the reconstructed image may be viewed. Alternatively, some or all of the processing described herein may be performed remotely by additional computing resources based upon raw or partially processed image data.

Once reconstructed, the cardiac image produced by the system of FIGS. 1 and 2 reveals the heart of the patient 18. As illustrated generally in FIG. 2, the image 64 may be displayed to show patient features, such as indicated at reference numeral 66 in FIG. 2. In traditional approaches to diagnosis of medical conditions, such as disease states, and more generally of medical conditions or events, a radiologist or physician would consider the reconstructed image 64 to discern characteristic features of interest. Such features 66 include coronary arteries or stenotic lesions of interest, and other features, which would be discernable in the image, based upon the skill and knowledge of the individual practitioner. Other analyses may be based upon capabilities of various CAD algorithms.

As will be appreciated by those skilled in the art, the CT system acquires data continuously, although at discrete image view frames corresponding to specific angular positions, as the source and detector rotate about the subject. Moreover, in helical modes of operation, the data are collected as the subject is displaced by movement of the table. The resulting data set contains a large quantity of data points representative of the intensity of radiation impacting elements of the detector at each of the angular positions. Reconstruction of images proceeds by selecting desired "reconstruction windows" or spans of data points which, based upon the reconstruction algorithm employed, provide sufficient information to calculate locations of features causing X-ray attenuation. Such reconstruction techniques may employ windows spanning all 360° of angular positions, but for reasons of computational efficiency and to reduce the incidence of motion induced artifacts, generally rely upon windows spanning 180° plus the included angle of the X-ray beam (typically referred to as the fan angle or as "$\alpha$"). Due to redundancy in the data, such reconstruction windows generally suffice for image reconstruction and provide improved temporal resolution. Other techniques may employ a combination of data acquired during a plurality of shorter windows, such as in techniques referred to as multi-sector reconstruction.

Phase-Based Reconstruction Window Selection

The methodology of volume rendering using CT imaging described above works well when the patient or the organ of interest remains stationary, because respective contours and boundaries in adjacent imaging slabs may be properly and seamlessly aligned. However, referring now to FIGS. 3 and 4, organs such as the heart 70 undergo regular, involuntary motion such that adjacent imaging slices 72 and 74, acquired at different times, $T_1$ and $T_2$ respectively, may not seamlessly align. As a result, the reconstructed axial slices 72 and 74 of cardiac tissue typically demonstrate artifacts in the form of shifted slabs in the coronal and sagittal views where each slab corresponds to a section of the heart that was scanned during the same heart cycle. In particular, each slab comprises successive images reconstructed by utilizing projection data from the same cardiac cycles but acquired by different detector rows.

Figure 3:
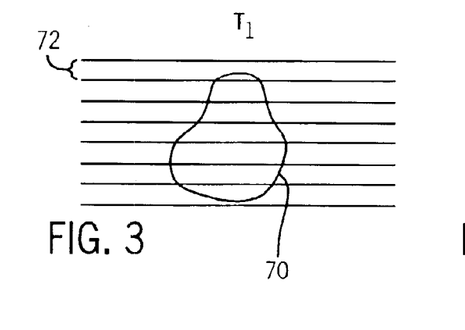
FIG. 3 is a depiction of a heart at a first time and at one phase of the cardiac cycle.
Figure 4:
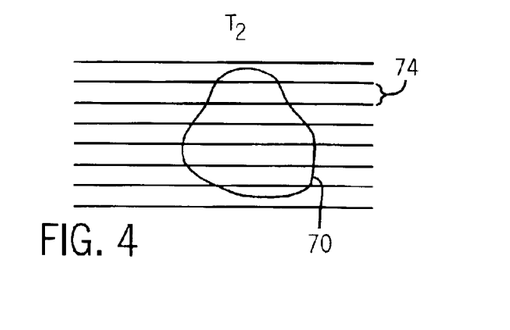
FIG. 4 is a depiction of a heart at a second time and at a different phase of the cardiac cycle.

These phase misregistration artifacts occur when successive reconstructed slabs correspond to cardiac cycles with different heart rates. For example, a reconstruction phase may be selected at the beginning of the reconstruction process that remains the same regardless of heart rate changes or heart rate regions. Such an invariate phase selection process will generate images that, although corresponding to the same percentile of all cardiac periods, might correspond to different states of the heart volume or of other cardiac features. Particularly dynamic tissues, such as the right coronary artery, may be especially effected by phase selection processes of this type, as evidenced by phase misregistration artifacts in the rendered volume.

To avoid phase misregistration artifacts, the reconstruction phases may be automatically determined for each cardiac cycle such that projections are obtained and analyzed at the same phase, regardless of changes in heart rate or beat irregularities. For example, referring now to the electrocardiogram (ECG) waveform 76 depicted in FIG. 5, the T-P interval 78 corresponds to the segment of the cardiac cycle between the end of systole and the beginning of atrial contraction. The end of systole, marked by the end of the T wave, is followed by rapid inflow of blood into the left ventricle. Between the end of the rapid inflow and the beginning of the atrial contraction, marked by the beginning of the P wave, the heart undergoes no major contractions and therefore maintains a relatively constant volume. Acquiring the necessary projection data during this interval 78, which lies between the end of systole and the beginning of atrial contraction, therefore, allows the reconstruction of images that have reduced motion artifacts.

Figure 5:
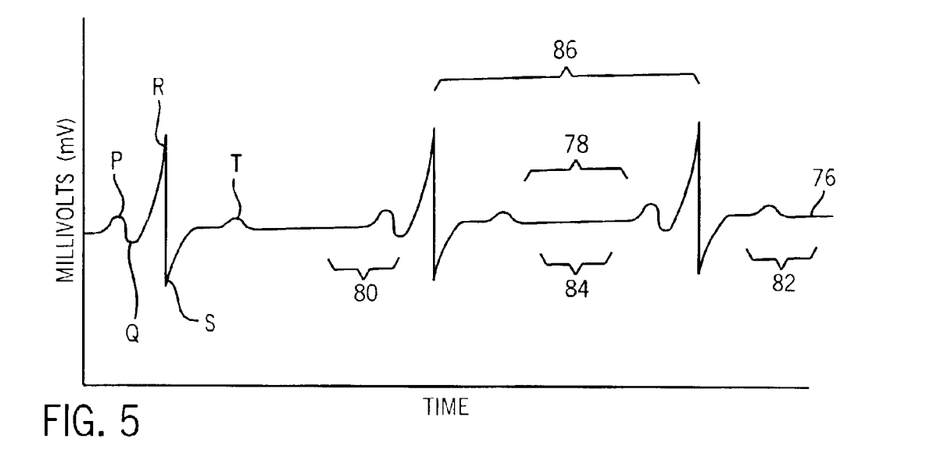
FIG. 5 is an ECG waveform depicting typical polarization and repolarization events.

One mechanism by which this may be done is to use concurrently acquired ECG data, such as the complete ECG waveform 76, such that the projections used for reconstruction correspond to the data acquired during the aforementioned interval 78 or some other desired interval. While reconstructions obtained during the interval 78 are discussed herein as one possibility, one skilled in the art will recognize that other phase intervals may be preferred depending on the cardiac feature of interest. For instance, some features may only be fully discerned during particular contraction or depolarization events of the cardiac cycle such that projection data may be desired from those phases alone. The operator or system may therefore designate the phase which identifies the projection data to be used for reconstruction, considering the statistical techniques described herein.

Current CT scanning systems, typically, do not capture complete ECG data concurrent with projection acquisition. Instead, the data typically includes only the times of some reference indicator, such as the occurrence of the R-peaks or the time interval between the R-peaks. The current algorithms use this R-peak data to reconstruct the heart images at prescribed time increments believed to correspond to the desired phase relative to the reference R-peak. However, this reconstruction process does not take into account other aspects of the ECG waveform 76, such as the next R-peak, the P-wave, or the QT-interval of the patient's heart cycle, in placing the reconstruction window 80, 82, 84. Due to the use of such prescribed increments, a misaligned reconstruction window 80, 82 may be inadvertently placed outside of the prescribed interval 78 or other interval, which may lead to phase misregistration artifacts if the misaligned reconstruction window 80, 82 includes cardiac contraction or other motion events. Such misalignment may occur as the result of changes in the patient's heart rate, abnormalities in the patient's cardiac cycle, or the failure to consider age or gender-based factors of the ECG waveform 76.

The present technique takes into account the reference indicator, i.e., the R-peak information, the patient's heart rate, and statistical information regarding the occurrence of ECG events, such as the waves and intervals, of the ECG waveform 76. This statistical information may arise from various sources, such as publications or references, and may provide timing information broken down by heart rate as well as by gender, age, medical condition or other characteristics of patient history. The present technique incorporates information regarding the reference indicator and combines this information with the calculated distance of the reconstruction window from the end of the QT-interval and the beginning of the P-wave. Because only R-peak information is typically included with the image data, these other features of the ECG waveform 76 are calculated from the statistical information as a function of patient's heart rate. The present technique may thereby be used to select the optimal phase of reconstruction for each slab of the scanned cardiac volume. That is, for each cardiac cycle this technique allows for the proper placement of an aligned reconstruction window 84. In addition, irregular cardiac cycles which are deemed unsuitable, either by the operator or some automated quality threshold, may be excluded from the reconstruction, so that only the most useful data sets are used to generate the cardiac volume rendering.

Figure 6:
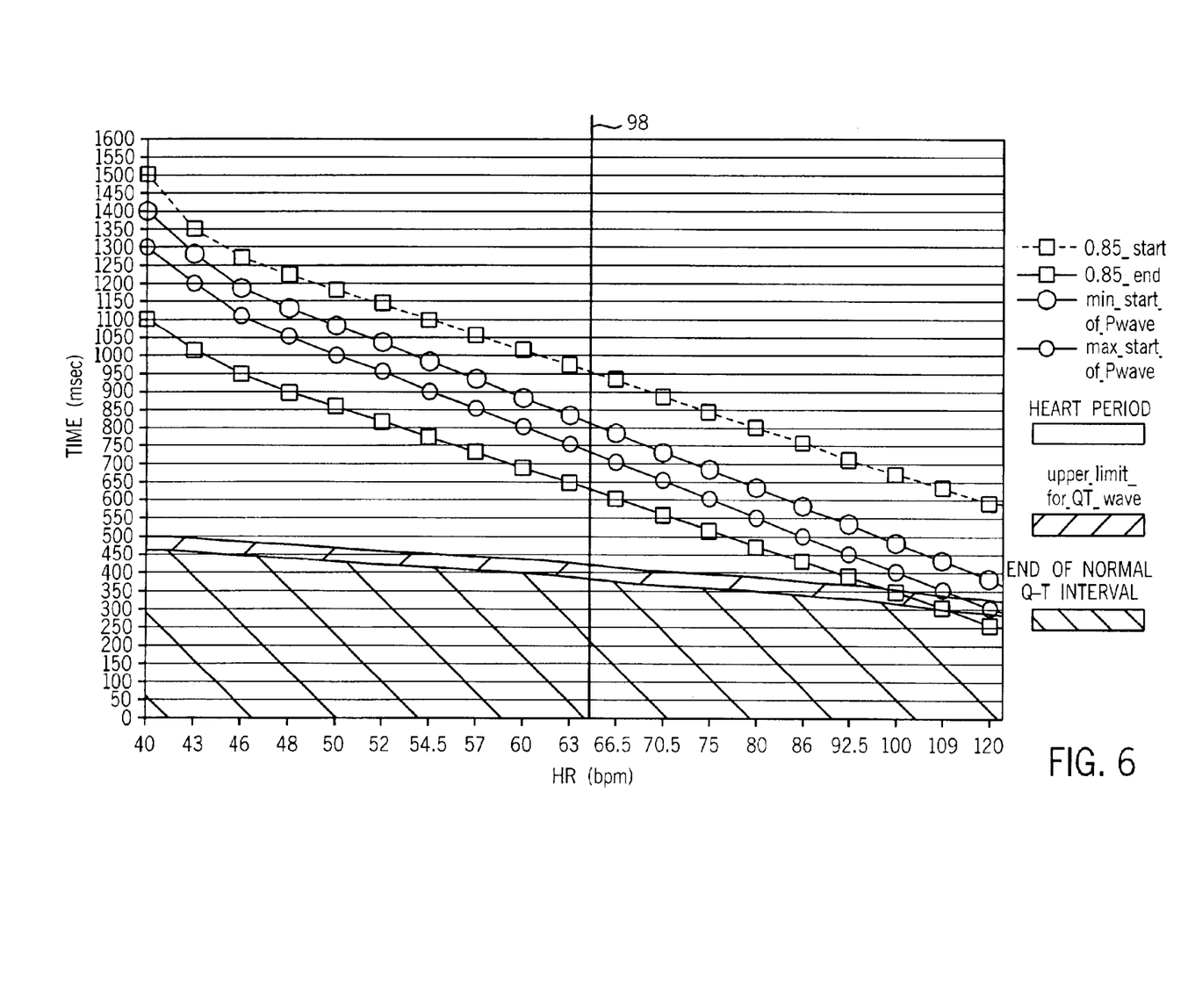
FIG. 6 is a chart depicting statistical parameters used for determining the start and end of a reconstruction window based upon the end of the normal QT-interval and the start of the P-wave.

For example, knowing the patient's heart rate and the operator or system prescribed phase, the reconstruction window 84 may be automatically selected using a specified feature of the cardiac waveform, such as the R-peak location and statistical information regarding the ECG waveform 76. The statistical information, an example of which is depicted in FIG. 6, allows the P-wave and the T-wave locations to be calculated in relation to an R-peak and thereby allows the reconstruction window to be selected in accordance with the prescribed phase. Because the phase period is not set at a fixed time interval from each R-peak, but instead takes into account the patient's heart rate and the relevant statistical data, each reconstruction window is independently selected. Heart rate changes or other irregularities can thereby be accommodated when positioning the reconstruction window. Each slab of the scanned cardiac volume is thereby optimized to minimize artifacts such as those associated with phase misregistration. Though the example provided discusses cardiac imaging and cardiac cycles, other dynamic tissue, which undergoes recurring movement phases, may also benefit from these techniques.

The width of the reconstruction window 84 may also be determined by the type of reconstruction technique is employed. As noted above, one such technique is segment, or half scan, reconstruction which uses projection data acquired from 180 degrees plus the angle ($\alpha$) of rotation of the X-ray beam (i.e., 180°+$\alpha$) to reconstruct an axial slice, known as half scan reconstruction. The selected projection data corresponds to a window of acquisition centered on the desired cardiac phase, that is the aligned reconstruction window 84. For example, for a gantry speed of 2 rotations per second, the effective duration corresponding to the 180°+$\alpha$ reconstruction window is approximately 330 milliseconds, meaning that the aligned reconstruction window 84 is 330 milliseconds "wide."

Figure 7:
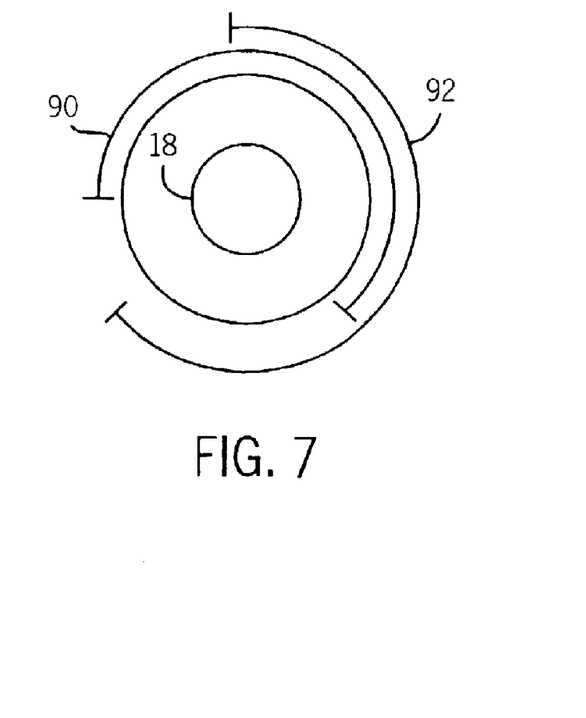
FIG. 7 is a depiction of gantry placement in a CT imaging system using a segment reconstruction technique.

For example, referring now to FIG. 7, a first segment 90 corresponding to a first image is acquired by rotating the gantry 54 around the patient 18 by 180°+$\alpha$. Data acquired within the first segment 90 corresponds to the data collected during the desired phase, as determined by the patient's heart rate, referenced features of the cardiac cycle (i.e., the R-peaks in the illustrated embodiment), the ECG statistical information provided, and the prescribed phase. The subsequent segment 92 comprises data similarly obtained from a subsequent heart cycle and represents adjacent imaging data that may be aligned to a slab that includes the first segment 90 without phase misregistration artifacts. The first segment 90 and second segment 92 each correspond to 180°+$\alpha$ rotation of the gantry 54 and each require approximately 330 milliseconds for acquisition in a present implementation, i.e., the gantry period is equal to 0.5 sec.

Figure 8:
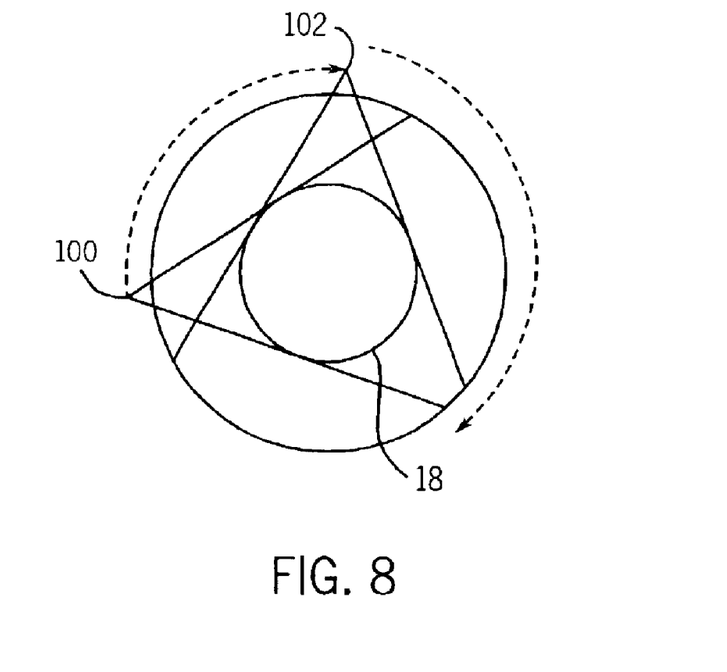
FIG. 8 is a depiction of gantry placement in a CT imaging system using a multi-sector reconstruction technique.

In some instances, when the patient's heart rate is too high to insure that the available data falls within a substantially motion-free section of the cardiac cycle, depicted by divider 98 on FIG. 6, a multi-sector reconstruction technique may be employed. In a present implementation, the total length of the projection dataset still corresponds to 180°+$\alpha$ of gantry rotation. However, this projection data is selected from successive cardiac cycles, which are merged to provide the desired data for reconstruction. This approach is depicted in FIG. 8 in which a first sector 100 and a second sector 102, acquired during a successive cardiac cycle, are seen to comprise 180°+$\alpha$ of gantry rotation when taken together. In this manner, the time associated with the reconstruction windows of the first sector 100 and second sector 102 are shortened to 165 milliseconds (i.e., half of 330 milliseconds), thereby accommodating faster heart rates which provide shorter phases of cardiac immobility. If necessary, additional sectors may be merged to further reduce the effective duration of each reconstruction window. Each sector is, presumably, identically positioned relative to the ECG waveform such that the end of the preceding sector properly aligns with the beginning of the succeeding sector to form a virtually continuous projection dataset. Therefore no phase misregistration artifacts are introduced within the reconstruction of an individual image.

The decision regarding which reconstruction technique to use, half scan or multi-sector, may be automatically decided by an algorithm. The algorithm may identify the candidate sectors from the relevant cardiac cycles based upon the desired cardiac reconstruction phase and the image z-location, i.e., the linear displacement, as discussed in more detail below.

Statistical data, such as that illustrated graphically in FIG. 6, may be used for this selection process. For example, where cardiac cycles of durations within a specified range are detected, as determined by reference to the statistical data, a $180°+\alpha$ reconstruction window and corresponding reconstruction algorithm may be selected, while for durations below the specified range multi-sector reconstruction may be employed.

Slab Consistency Reconstruction Window Selection

In addition to the selective placement of the reconstruction window, as related above, phase misregistration may also be addressed by selectively combining projection data such that inconsistencies are minimized or reduced in the projection data set used for reconstruction. Selection may be based upon one or more consistency criteria, which allow projection data to be selected such that the consistency with data used for reconstructing adjacent slices is maximized and which enhance the selection of sectors for multi-sector reconstruction of individual images. Selective combination of the projection data in this manner is useful in reducing phase misregistration artifacts in images of dynamic tissue whether or not the motion of the tissue consists of recurring phases, such as the cardiac cycle.

For example, in CT cardiac imaging, the imaging protocol may allow for linear displacement of the patient table at a rate which allows for the acquisition of redundant projection data. The redundant projection data may facilitate overlapping the reconstructed slices or may help accommodate heart rate changes observed during the scan procedure. In particular, this procedure allows projection data to be acquired that cover the same location along the patient axis from several gantry rotations and, depending on the heart rate, from one or more heart cycles. To maximize image quality, the projection data is analyzed to select the projection data for reconstruction at the desired cardiac phase, which may be determined by the technique discussed above to determine a temporal window with minimal cardiac motion. However, observance of these constraints may result in a suboptimal reconstruction projection set due to the difficulties involved in satisfying all of the constraints.

As noted above, depending on the temporal resolution desired, either half-scan reconstruction, as discussed with regard to FIG. 7, or multi-sector reconstruction, as discussed with regard to FIG. 8, may be employed. For example, referring now to FIG. 9, the candidate sectors of the acquired projection data available to reconstruct an image are determined at step 110. In one embodiment, the phase-based reconstruction window selection techniques described above may be utilized, either alone or in conjunction with other criteria, to determine the candidate sectors at step 110. However, the consistency-based reconstruction is relatively general and may also be used with other dynamic tissues that do not undergo recurring motion, such as the cardiac cycle.

Figure 9:
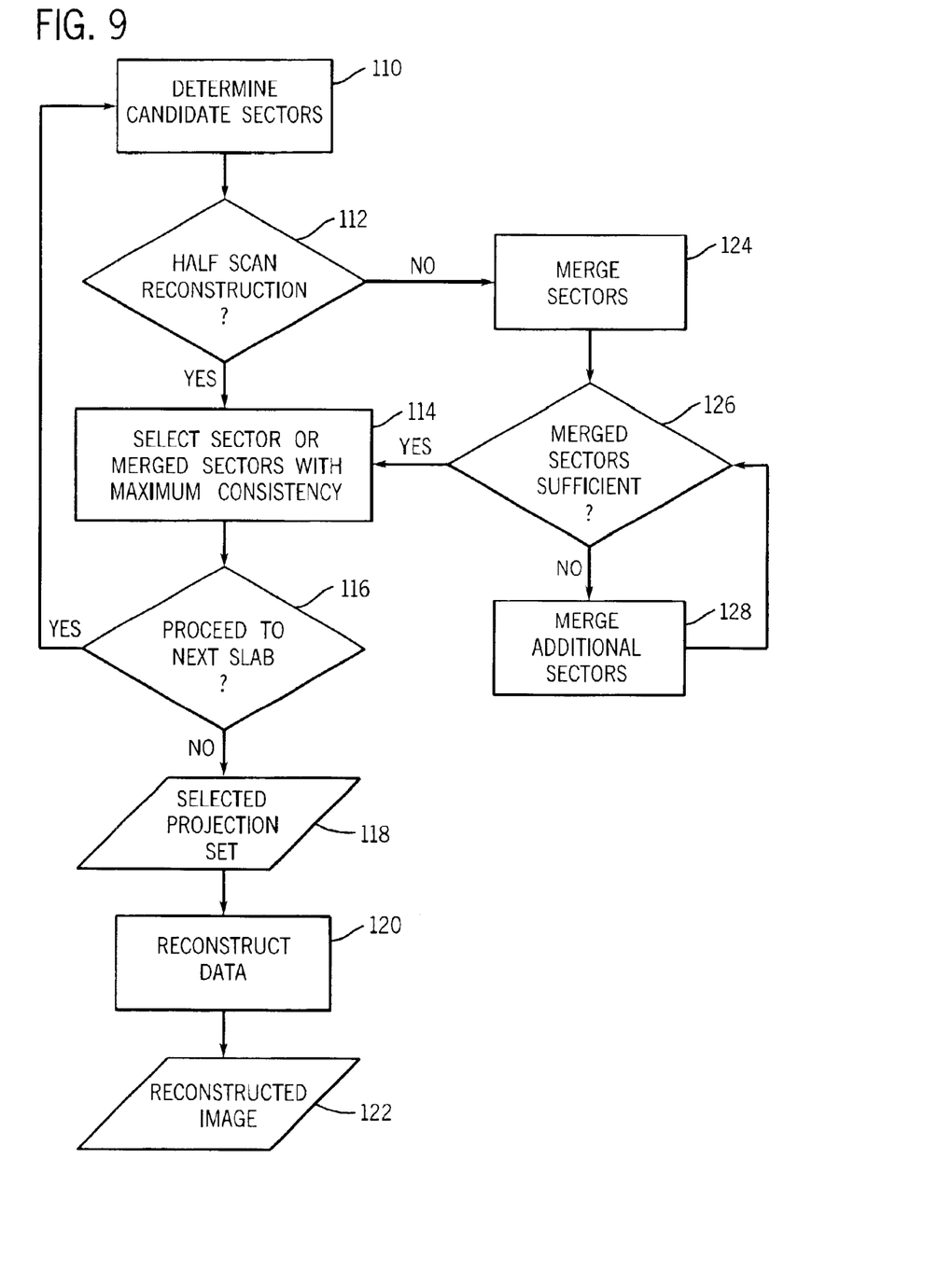
FIG. 9 is a flowchart depicting the steps in a consistency based projection selection technique.

In the half-scan reconstruction case, as determined at decision block 112, where single sectors, i.e., segments, individually provide sufficient projection data for image reconstruction, the candidate sectors are evaluated based upon one or more consistency criteria. The projection dataset that provides the maximum consistency with the projection data of one or both of the adjacent images is selected at step 114. The selection step may consider the view angles from which the candidate sectors are acquired or other acquisition information. The process is repeated for any remaining images, as depicted by decision block 116, with the selected sectors comprising the selected projection set 118. The selected projection set 118 is reconstructed at step 120 to form reconstructed image 122.

In the multi-sector reconstruction approach, where single sectors do not individually provide sufficient projection data for image reconstruction, pairs of the candidate sectors may be merged at step 124 to form two-sector groups. Each candidate two-sector group is evaluated at decision block 126 to determine if one or more of the candidate groups provides sufficient projection data for image reconstruction, i.e., the desired phase and the desired temporal resolution.

In addition, the merge cost associated with each merge group may be considered in evaluating the merge groups. For example, when multiple sectors are merged for a multi-sector recon, one way of measuring consistency among the projections used for a particular reconstruction may be to calculate the merge cost, such as by taking the difference in the overlapping angular regions of the projection data of the sectors to be merged. This merge cost is the inconsistency between the constituent sectors in the merge group. In evaluating the merge cost and the sufficiency of the data provided by each merge group, it is generally desirable to minimize the merge cost. For example, a merge cost threshold may be established which would cause merge groups exceeding the threshold being rejected. The threshold may have a single value or may vary in accord with other factors, such as the sufficiency of the data provided for reconstruction by the merge group. However, mechanisms other than a threshold may also be employed to reduce or minimize merge costs.

If one or more of the candidate two-sector groups provide sufficient projection data at a sufficiently low merge cost, the two-sector group which provides the maximum consistency with the projection data of one or both of the adjacent slices is selected at step 114. Consistency between adjacent slices may be assessed in a manner similar to the assessment of merge cost, such as by calculating the difference between the projections of the adjacent slices in conjunction with the start angle of each projection dataset. Any additional slabs are processed, as determined at decision block 116. The selected projection data 118 is then reconstructed at step 120 to produce a reconstructed image 122.

However, if none of the two-sector groups provide sufficient projection data at a sufficiently low merge cost, an additional sector is added to each two-sector group at step 128 to form three-sector groups which are then tested for sufficiency at decision block 126. This process may be repeated to form four-sector groups, five-sector groups, and so on as needed until an acceptable merge group is determined and selected.

One embodiment of the present technique applies the above technique in an iterative manner. For example, in order to cover the entire volume of the heart, a stack of images is formed, each at a different z-location, i.e., linear displacement. The stack of images may be uniformly or non-uniformly separated, as determined by the imaging protocol. Once a set of projection datasets is obtained which corresponds to the desired stack of images, an iterative analysis process may be initiated. The total "cost" of the stack of images may be calculated as the summation merge cost of each projection dataset corresponding to the images in the set. The potential projection datasets for each image may then be considered and the particular combinations resulting in the desired images are taken as one additional candidate for the reconstruction stack. The various candidate stacks may then be considered in view of their cost and the stack set with the lowest total merge cost, absent some other criteria, may be selected as the optimum stack set for the reconstruction of the desired stack of images.

In addition, for any reconstruction dataset for a single image, filtered backprojection, as discussed above, may be used to obtain the image. To employ filtered backprojection, the reconstruction dataset is contiguous in angular direction as $\alpha$ is measured. However statistical iterative reconstruction techniques (SIRT) may be employed to relax this requirement. If SIRT is employed, projections outside of the desired phase can be included in the reconstruction set by eliminating the need to align the end and the beginning of the sectors when forming the reconstruction set. Use of SIRT would, therefore, increase the number of candidates for the formation of multi-sector based reconstruction sets, that is, there are more opportunities to have an image for a give z-location. Since more projections used in the reconstruction means improved signal to noise ratio, SIRT may also improve image quality in this respect.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for selecting a projection set for one or more images, comprising:
    determining one or more candidate sectors or sets of candidate sectors containing projection data associated with each of one or more images;
    evaluating the one or more candidate sectors or sets of candidate sectors based upon one or more consistency criteria; and
    selecting a suitable sector or set of sectors from the one or more candidate sectors or sets of candidate sectors for reconstruction into an image, wherein the suitable sector or set of sectors provides the best consistency with projection data for an adjacent image based upon the one or more consistency criteria.

2. The method as recited in claim 1, wherein determining the one or more candidate sectors or sets of candidate sectors comprises identifying one or more sectors at a desired cardiac phase.

3. The method as recited in claim 1, further comprising reconstructing the suitable sector or set of sectors of each image to generate a reconstructed image.

4. A tangible medium for selecting a projection set for one or more image slabs, comprising:
    a routine for determining one or more candidate sectors or sets of candidate sectors containing projection data associated with each of one or more images;
    a routine for evaluating the one or more candidate sectors or sets of candidate sectors based upon one or more consistency criteria; and
    a routine for selecting a suitable sector or set of sectors from the one or more candidate sectors or sets of candidate sectors for reconstruction into an image, wherein the suitable sector or set of sectors provides the best consistency with projection data for an adjacent image based upon the one or more consistency criteria.

5. The tangible medium as recited in claim 4, wherein the routine for determining the one or more candidate sectors or sets of candidate sectors identifies one or more sectors at a desired cardiac phase.

6. The tangible medium as recited in claim 4, further comprising a routine for reconstructing the suitable sector or set of sectors of each image to generate a reconstructed image.

7. A CT image analysis system comprising:
    an X-ray source configured to emit a stream of radiation;
    a detector configured to detect the stream of radiation and to generate one or more signals responsive to the stream of radiation;
    a system controller configured to control the X-ray source and to acquire the one or more signals, wherein the one or more signals comprise a set of projection data;
    a computer system capable of being operably coupled to at least one of a CT cardiac image acquisition system or CT image storage system, the computer system is configured to determine one or more candidate sectors or sets of candidate sectors containing projection data associated with each of one or more images, to evaluate the one or more candidate sectors or sets of candidate sectors based upon one or more consistency criteria, and to select a suitable sector or set of sectors from the one or more candidate sectors or sets of candidate sectors for reconstruction into an image, wherein the selected sector or set of sectors provides the best consistency with projection data for an adjacent image based upon the one or more consistency criteria;
    an operator workstation configured to display a reconstructed image generated by the computer system.

8. The system as recited in claim 7, wherein the computer system determines the one or more candidate sectors or sets of candidate sectors by identifying one or more sectors at a desired cardiac phase.

9. The system as recited in claim 7, wherein the computer system is further configured to reconstruct the suitable sector of each image to generate the reconstructed image.

10. A CT image analysis system comprising:
    means for determining one or more candidate sectors or sets of candidate sectors containing projection data associated with each of one or more images;
    means for evaluating the one or more candidate sectors or sets of candidate sectors based upon one or more consistency criteria; and
    means for selecting a suitable sector or set of sectors from the one or more candidate sectors or sets of candidate sectors for reconstruction into an image, wherein the suitable sector or set of sectors provides the best consistency with projection data for an adjacent image based upon the one or more consistency criteria.

11. A method for selecting a set of projection datasets for reconstruction, comprising:
    obtaining an initial set of projection datasets corresponding to a desired stack of images;

calculating at least one of a merge cost and a consistency criterion for each projection dataset corresponding to an image of the desired stack of images;

selecting the projection dataset corresponding to each image based upon at least one of the merge cost and the consistency criterion.

12. The method as recited in claim 11, wherein calculating the merge cost comprises calculating a difference in an overlapping angular region of the projection dataset of one or more sectors to be merged.

13. The method as recited in claim 11, wherein selecting the projection datasets comprises selecting the projection dataset which result in the lowest total merge cost for the desired stack of images.

14. A tangible medium for selecting a set of projection datasets for reconstruction, comprising:

a routine for obtaining an initial set of projection datasets corresponding to a desired stack of images;

a routine for calculating at least one of a merge cost and a consistency criterion for each projection dataset corresponding to an image of the desired stack of images;

a routine for selecting the projection dataset corresponding to each image based upon at least one of the merge cost and the consistency criterion.

15. The tangible medium as recited in claim 14, wherein the routine for calculating the merge cost calculates a difference in an overlapping angular region of the projection dataset of one or more sectors to be merged.

16. The tangible medium as recited in claim 14, wherein the routine for selecting the projection datasets selects the projection datasets which result in the lowest total merge cost for the desired stack of images.

17. A CT image analysis system comprising:

an X-ray source configured to emit a stream of radiation;

a detector configured to detect the stream of radiation and to generate one or more signals responsive to the stream of radiation;

a system controller configured to control the X-ray source and to acquire the one or more signals, wherein the one or more signals comprise a set of projection data;

a computer system capable of being operably coupled to at least one of a CT cardiac image acquisition system or CT image storage system, the computer system is configured to obtain an initial set of projection datasets corresponding to a desired stack of images, to calculate at least one of a merge cost and a consistency criterion for each projection dataset corresponding to an image of the desired stack of images, and to select the projection dataset corresponding to each image based upon at least one of the merge cost and the consistency criterion;

an operator workstation configured to display a reconstructed image generated by the computer system.

18. The system as recited in claim 17, wherein the computer system calculates the merge cost by calculating a difference in an overlapping angular region of the projection dataset of one or more sectors to be merged.

19. The system as recited in claim 17, wherein the computer system selects the projection datasets by selecting the projection datasets which result in the lowest total merge cost for the desired stack of images.

20. A CT cardiac image analysis system comprising:

means for obtaining an initial set of projection datasets corresponding to a desired stack of images;

means for calculating at least one of a merge cost and a consistency criterion for each projection dataset corresponding to an image of the desired stack of images;

means for selecting the projection dataset corresponding to each image based upon at least one of the merge cost and the consistency criterion.

* * * * *